(12) United States Patent
Feig

(10) Patent No.: US 7,213,075 B2
(45) Date of Patent: May 1, 2007

(54) APPLICATION SERVER AND STREAMING SERVER STREAMING MULTIMEDIA FILE IN A CLIENT SPECIFIC FORMAT

(75) Inventor: Ephraim Feig, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 1204 days.

(21) Appl. No.: 09/736,258

(22) Filed: Dec. 15, 2000

(65) Prior Publication Data

US 2002/0078218 A1    Jun. 20, 2002

(51) Int. Cl.
*G06F 15/16* (2006.01)
*G06F 9/00* (2006.01)
*G06F 15/173* (2006.01)

(52) U.S. Cl. .................. 709/231; 718/105; 709/203

(58) Field of Classification Search ............... 709/231, 709/200–203, 228–230, 232–235; 718/100, 718/104, 105; 719/310, 311–317
See application file for complete search history.

(56) References Cited

U.S. PATENT DOCUMENTS

| | | | | |
|---|---|---|---|---|
| 5,758,085 | A | | 5/1998 | Kouoheris et al. .......... 709/231 |
| 5,805,821 | A | * | 9/1998 | Saxena et al. ............... 709/231 |
| 5,832,499 | A | * | 11/1998 | Gustman ................ 707/103 R |
| 5,838,950 | A | * | 11/1998 | Young et al. ................. 703/21 |
| 5,862,403 | A | * | 1/1999 | Kanai et al. .................... 710/6 |
| 5,898,892 | A | | 4/1999 | Gulick et al. ................. 710/52 |
| 5,933,155 | A | * | 8/1999 | Akeley ....................... 345/536 |
| 5,933,603 | A | | 8/1999 | Vahalia et al. .............. 709/225 |
| 5,996,015 | A | * | 11/1999 | Day et al. .................... 709/226 |
| 6,037,991 | A | * | 3/2000 | Thro et al. ................... 725/116 |
| 6,078,953 | A | * | 6/2000 | Vaid et al. ................... 709/223 |
| 6,185,184 | B1 | * | 2/2001 | Mattaway et al. .......... 370/230 |
| 6,320,880 | B1 | * | 11/2001 | Suvanen ..................... 370/512 |
| 6,373,855 | B1 | * | 4/2002 | Downing et al. ........... 370/468 |
| 6,405,256 | B1 | * | 6/2002 | Lin et al. .................... 709/231 |
| 6,408,310 | B1 | * | 6/2002 | Hart ........................... 707/201 |
| 6,421,733 | B1 | * | 7/2002 | Tso et al. .................... 709/246 |
| 6,618,385 | B1 | * | 9/2003 | Cousins ..................... 370/401 |
| 6,681,306 | B1 | * | 1/2004 | Kessler et al. .............. 711/171 |
| 6,708,213 | B1 | * | 3/2004 | Bommaiah et al. ......... 709/226 |
| 6,732,111 | B2 | * | 5/2004 | Brodersen et al. .......... 707/101 |
| 6,747,998 | B1 | * | 6/2004 | Enari .......................... 370/516 |
| 6,857,130 | B2 | * | 2/2005 | Srikantan et al. ............. 725/93 |
| 2001/0034736 | A1 | * | 10/2001 | Eylon et al. ................ 707/200 |
| 2001/0036322 | A1 | * | 11/2001 | Bloomfield et al. ........ 382/276 |

(Continued)

OTHER PUBLICATIONS

U.S. Appl. No. 09/750,577, filed Dec. 29, 2000, Ephraim Feig, Latches-Links As Virtual Attachments In Documents.

*Primary Examiner*—Nathan J. Flynn
*Assistant Examiner*—Haresh Patel

(57) ABSTRACT

A method and data communication system for transferring multimedia data which stores on an application server a multimedia file including a plurality groups of multimedia data. Each group has a predetermined data size. Next, the system receives a client request and reads a client address at the application server. The client address corresponds to at least one client apparatus. Next, the system strips consecutive groups from the multimedia file and buffers the stripped groups in a staging buffer. Then, the system transfers to a streaming server, consecutive groups from the staging buffer and the client address. The system then converts at the streaming server, each of the consecutive groups received from the staging buffer into a format readable by the at least one client apparatus. Finally, the streaming server sends each of the converted groups to the at least one client apparatus.

14 Claims, 17 Drawing Sheets

U.S. PATENT DOCUMENTS

| | | |
|---|---|---|
| 2002/0023127 A1* | 2/2002 | Sabeti ........................ 709/203 |
| 2002/0093964 A1* | 7/2002 | Yik et al. .................... 370/400 |
| 2002/0138640 A1* | 9/2002 | Raz et al. .................... 709/231 |
| 2003/0023790 A1* | 1/2003 | Gerhart ....................... 710/58 |
| 2003/0050535 A1* | 3/2003 | Bowman et al. ............. 600/300 |
| 2003/0140159 A1* | 7/2003 | Campbell et al. ........... 709/231 |
| 2003/0198184 A1* | 10/2003 | Huang et al. ................ 370/231 |
| 2004/0136459 A1* | 7/2004 | Yavits et al. ........... 375/240.12 |

* cited by examiner

SEQUENCE OF DISPLAYING/RECIEVING CONVERTED GROUPS AT CLIENT APPARATUS

APPLICATION SERVER AND STREAMING SERVER STREAMING MULTIMEDIA FILE IN A CLIENT SPECIFIC FORMAT

FIELD OF THE INVENTION

This invention relates to a method and system for selectively storing files, and more particularly, to a method and system for selectively storing multimedia files on application servers and streaming servers, based on a number of client requests, in which the streaming servers are capable of streaming multimedia files over a communications network to requesting clients.

DESCRIPTION OF RELATED ART

Streaming technologies are becoming popular on the world-wide-web (WWW). Streaming allows clients connected via the Internet to receive and use video data and other forms of multimedia data (hereinafter, "multimedia data") before downloading entire files containing the multimedia data. A client can download a portion of a file, decompress that portion, and begin using a program, such as video player program, before the downloading of the entire file is completed. The downloaded multimedia data is buffered, allowing the client to use the downloaded multimedia data while the rest of the multimedia data is being downloaded. However, the client can only access the portion already downloaded, not the entire file.

Data communication networks for delivering multimedia data to clients, such as pay-per-view services, typically include a data communication system and a client apparatus for each client. Data communication systems usually include: one or more application servers, each having a storage for multimedia files, one or more streaming servers for sending the multimedia files to client apparatuses, and a network for connecting the data communication system to all of the client apparatuses. Each streaming server has a random access memory (RAM) for receiving and storing multimedia files that are transferred to the RAM from the one or more application servers. Multimedia files are transferred to each streaming server at approximately the same rate that the same multimedia files are delivered to client apparatuses. Alternatively, multimedia files can be transferred from a RAM of a streaming server to a RAM of another streaming server.

To transfer a multimedia file to a client apparatus after receiving a request, the streaming server having the requested multimedia file is connected to the requesting client apparatus. Then, the requested multimedia file is transferred via the connection to the requesting client apparatus. Typically, a streaming server stores all multimedia files, which are to be streamed to the requesting client apparatuses.

However, applications such as data management, transfer, and processing can be better performed by storing some multimedia files, which are streamed to client apparatuses, on an application server, and utilizing streaming servers only to performing the streaming function. Storing multimedia files on an application server is desirable, because the application server is where data management can be optimized and perfected. Further, it is wasteful of memory space to store all multimedia files to be streamed in streaming servers, and may even result in overloading of the streaming severs due to reception of a large number of client requests during streaming.

However, poor performance of application servers is achieved by storing all multimedia files to be streamed, on the application servers. Therefore, it is important to have a data communication system that selectively stores some multimedia files on application servers and other multimedia files on streaming servers.

Several patents have addressed problems associated with storing multimedia files on streaming servers. U.S. Pat. No. 5,758,085 to Kouoheris and Kumar addresses the problem of limited bandwidth for transferring multimedia data over telephone lines and television networks to clients. Overhead associated with the delivery of video content from a server to a requesting client is reduced by off-loading video content to switches in a network, which can more efficiently deliver the video content to the requesting clients. However, the Kouoheris invention does not address the above need to store some multimedia files on application servers.

U.S. Pat. No. 5,933,603 to Vahalia and Forecast teaches a video file sever that provides video-on-demand service by maintaining and dynamically allocating sliding windows of video data in stream servers. With this invention a stream server can be prevented from becoming overloaded with client requests for transfer of data by allocating reserve memory in another stream server to store a duplicate of the original data set in the overloaded stream server. However, the Vahalia invention simply balances data storage between multiple streaming servers and does not address the above need to store some multimedia files on application servers.

In light of the above-mentioned disadvantages, there is an apparent need for a data communication system having an application server and a streaming server, for selectively storing some multimedia files on the streaming server and other multimedia files on the application server.

SUMMARY OF THE INVENTION

It is an aspect of the present invention to provide a data communication system that solves the above-identified problems.

It is a further aspect of the present invention to provide a data communication system that allows multimedia files to be managed and optimized on an application server.

It is yet another aspect of the present invention to provide a data communication system that selectively stores some multimedia data files on an application server and other multimedia files on a streaming server.

It is another aspect of the present invention to provide a data communication system in which streaming servers are used as caching tools for streaming multimedia files.

It is a further aspect of the present invention to provide a data communication system in which multimedia files are selectively stored (kept) on a streaming server, based on a number of client requests for a multimedia file.

It is yet another aspect of the present invention to provide a data communication system for selectively purging multimedia files from a streaming server, based on a number of client requests for each multimedia file.

It is a further aspect of the present invention to provide a data communication system including an application server and a streaming server, for selectively streaming multimedia files from either the application server or the streaming server.

It is a another aspect of the present invention to provide a data communication system for selectively purging files including groups of data, from a streaming server based on a maximum group count corresponding to a maximum number of groups of data in each file.

It is yet another aspect of the present invention to provide a data communication system including an application server and a streaming server, for selectively transferring entire files from the application server to the streaming server.

It is another aspect of the present invention to provide a data communication system, for selectively buffering in a streaming server, groups of data of a multimedia file for a predetermined time period before transferring the groups to a client apparatus, based on a difference between a transfer rate (for the groups between an application server and the streaming server) and a sending rate (between the streaming server and the client apparatus).

The present invention overcomes the aforementioned disadvantages.

A first aspect of the present invention is a method and data communication system for transferring multimedia data. Initially, a multimedia file having groups of data is stored in an application server. Each group of the multimedia file corresponds to a single video frame, and each video frame has a corresponding frame display duration. The application server receives a client request, from a client apparatus and reads a client address of a requesting client apparatus based on the content of the client request. Next, the application server strips consecutive groups of data of the multimedia file. The application server then buffers the stripped groups in a staging buffer. The application server then transfers the client address, and the consecutive groups from the staging buffer to a streaming server. The streaming server then converts the consecutive groups into a standard streaming format. The streaming server then sends the converted groups to a client apparatus corresponding to the client address read by the application server. Finally, the client apparatus receives the converted groups, where a User is able to store, play, listen to, display, or manipulate the multimedia data as needed.

These and other objects, features and advantages of the present invention are described in the following detailed description of the invention which is to be read in conjunction with the accompanying drawings.

DETAILED DESCRIPTION

Figure 9:
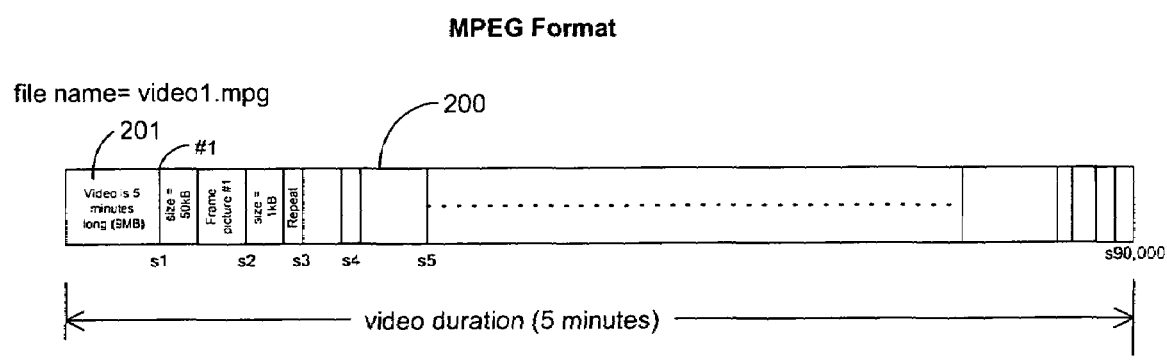
FIG. 9 is a diagram illustrating an exemplary multimedia file encoded in MPEG format which can be delivered to a requesting client apparatus over the data communication system of the present invention.

A first aspect of the present invention is a method and data communication system for transferring multimedia data. Initially, a multimedia file having groups of data is stored in an application server. Turning to FIG. 9, the multimedia file can be for example, a video file 200. FIG. 9 shows video file 200 made up of groups of multimedia data. Each group of video file 200 corresponds to a single video frame, and each video frame has a corresponding frame display duration. As shown, a header 201 indicates that video file 200 has a file name "video1.mpg" and that video file 200 is 5 minutes long. The "mpg" extension indicates that video file 200 is encoded in MPEG format. Video file 200 has 90,000 frames, with each frame having a frame starting signal designated by the letter "s" followed by a number. A single frame contains all of the data between sequential frame starting signals. For example, frame #1 contains all of the data between "s1" and "s2". FIG. 9 shows that frame #1 contains data for picture #1 that is 50 kB in size. As shown, different frames have different data sizes. For example, frame #2 is only 1 kB in size. Video file 200 is shown encoded in MPEG format, but the present invention is not limited to multimedia files encoded in the MPEG format. Note that in this embodiment we describe sending video files over the data communication system of the present invention.

However, suitable multimedia files include music files, computer generated graphics files, still-image files, sound files, or files containing other well known forms of continuous content media data. The scope of the data communication system of the present invention covers these forms of multimedia data, as well as uncompressed video data. Further, different kinds of multimedia data (video, sound, etc.) compressed at different rates, can be delivered over the data communication system. Additionally, different forms of multimedia data may be multiplexed together and delivered over the data communication system.

Figure 17:
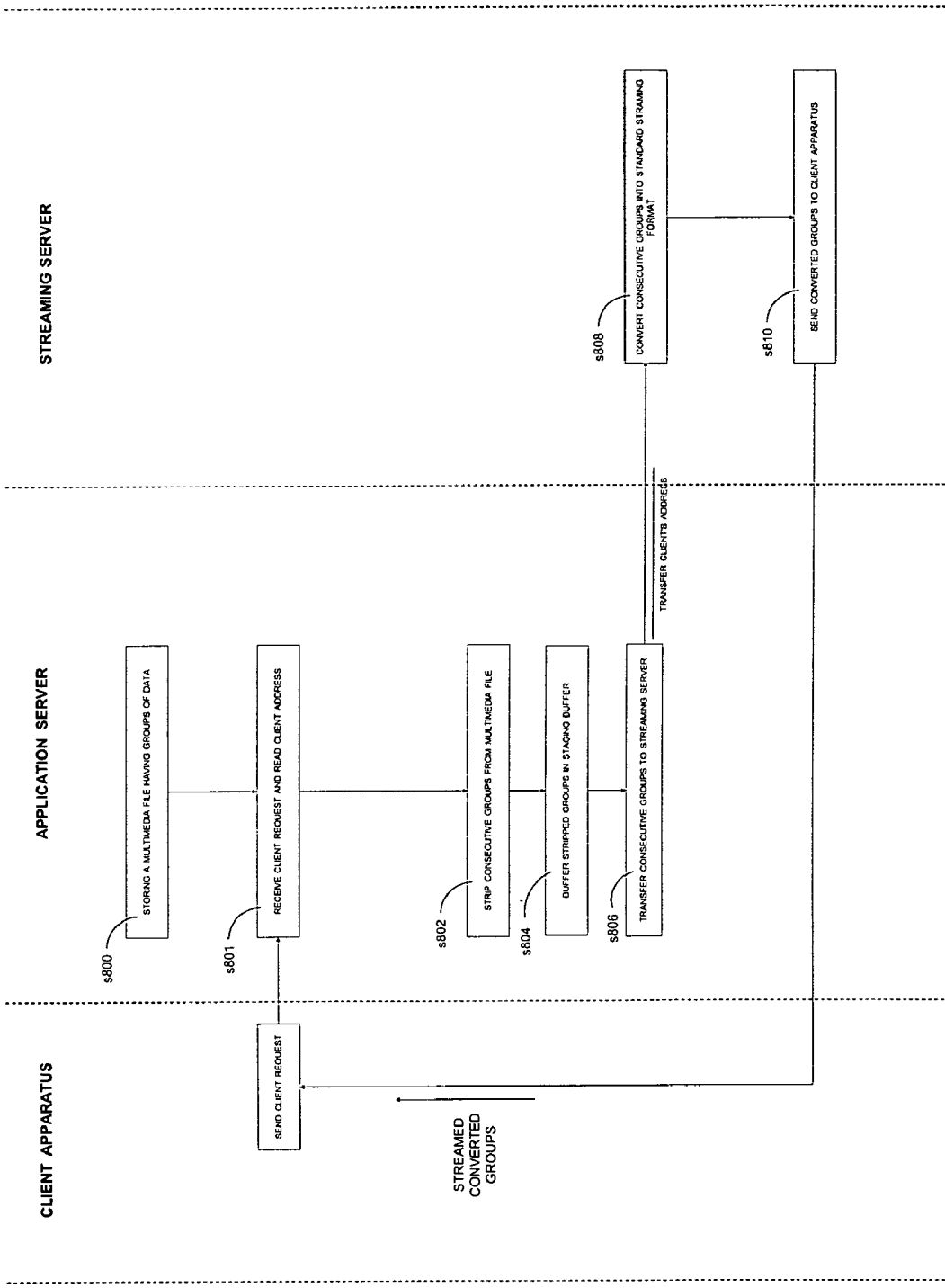
FIG. 17 is a swim lane diagram illustrating the sequence of operational steps carried out by the client apparatus, the application server, and the streaming server, shown in FIG. 2.

Now, the sequence of operational steps for the first aspect of the present invention are described with reference to FIG. 17. First, in a step s800, an application server stores a multimedia file, such as video file 200 of FIG. 9. The process then flows to a step s801, where the application server receives a client request, not shown, from a client apparatus. Further, the application server reads a client address of the requesting client apparatus based on the content of the client request. The process then flows to a step s802, where the application server strips consecutive groups of data of the multimedia file. Next, the process flows to a step s804, where the application server buffers the stripped groups in a staging buffer. The process then continues to a step s806, where the application server transfers the client address, and the consecutive groups from the staging buffer to a streaming server. The process then continues with a step s808, where the streaming server converts the consecutive groups into a standard streaming format. Examples of standard streaming formats are RTP, UDP, and TCP protocols. A useful text describing Internet standards and protocols is the book by D. C. Naik entitled "Internet Standards and Protocols", Microsoft Press, 1998. The process then flows to a step s810, where the streaming server sends the converted groups to the client apparatus corresponding to the client address read by the application server. The sending of converted groups is done by consecutively streaming the converted groups to the client apparatus.

The client apparatus can be, for example, a personal computer, a fax machine, a designated hard drive, a telephone interface, a wireless telephone, a radio-receiver, a personal digital assistant (PDA), or any other device capable of receiving multimedia data. Finally, the client apparatus receives the converted groups, where a User is able to store, play, listen to, display, or manipulate the multimedia data as needed.

Figure 1:
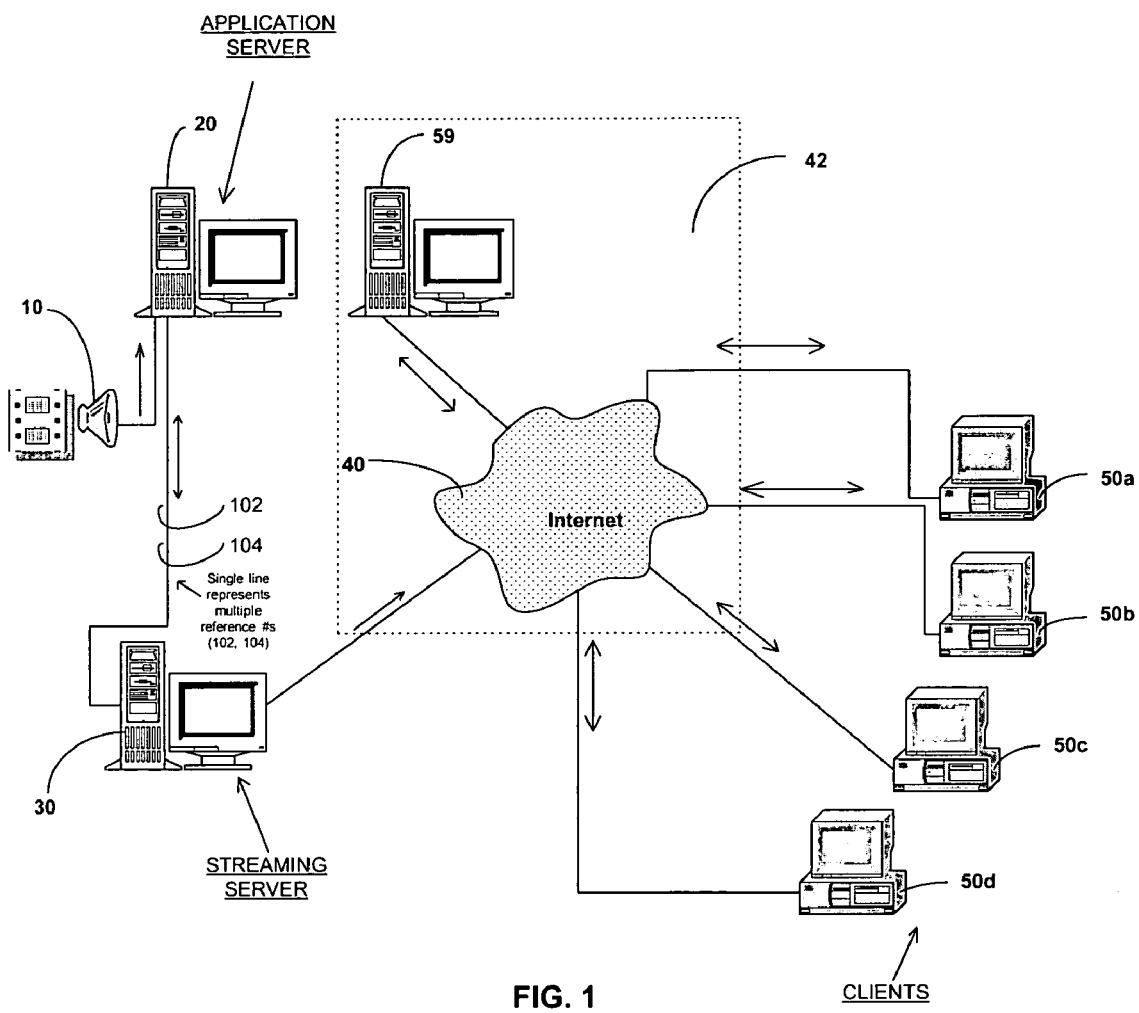
FIG. 1, is a network diagram illustrating the relationship between a multimedia device, an application server, a streaming server, a web management server, and a plurality of client apparatuses as they are interconnected over networks.

Referring to FIG. 1, the network diagram illustrates the relationship between a multimedia device 10, an application server 20, a streaming server 30, a web management server 59, and a plurality of client apparatuses (50a, 50b, 50c, and 50d), as they are interconnected over an Internet 40. A useful article describing the streaming of multimedia data is entitled "Streaming Multimedia Data", which can be found at the following website: http://www.teamsolutions.co.uk/streaming.html. Another useful website article is entitled, "Streaming methods: Web Server, vs. Streaming Media Server", is located at http://www.microsoft.com/windows/windowsmedia/en/compare/webservvstreamserv.asp. To simplify the figures, Internet 40 and web management server 59 are shown in other figures as a box labeled "Internet Service Provider (ISP)" 42.

A User utilizes multimedia device 10 to gather multimedia data to store in a multimedia file or to send the multimedia data in real time over a network to client apparatuses, such as client apparatuses (50a, 50b, 50c, and 50d). Multimedia device 10 can be, for example, a camera, a DVD player, a VCR, a personal computer, a fax machine, a telephone interface, a wireless telephone, a radio-transmitter, a personal digital assistant (PDA), or any other device capable of sending multimedia data. Application server 20 is used to encode the multimedia data sent from multimedia device 10. Application server 20 is typically a workstation equipped with video cards, sound cards, and a Microsoft Windows NT or a UNIX operating system. However, personal computers can be used in place of a workstation. Details of the Windows NT operating system are described, for example, in the book by M. Brain, entitled "WIN 32 System Services", Prentice Hall, 1996.

Encoding of the multimedia data from multimedia device 10 can be done using the software and audio and video capture cards by Osprey® (model Osprey®-200). After encoding the multimedia data, application server 20 sends the encoded data to streaming sever 30. Streaming server 30 can be directly connected or connected over a network to application server 20. FIG. 1 shows application server 20 connected to streaming server using a direct connector. However, connection can be made over a Local Area Network (LAN), a wireless network, or using Internet Service Provider (ISP) 42. The type of connection to be used should be selected according to the type of multimedia sent and the total bandwidth of the multimedia data sent between application server 20 and streaming server 30.

Streaming server 30 sends the multimedia data to a specific one of client apparatuses (50a, 50b, 50c, and 50d) based on a client address, not shown. The address is read in application server 20 from a client request, not shown, which is received from one of client apparatuses (50a, 50b, 50c, and 50d). Microsoft® Windows® Streaming Technologies is a software program used by many companies to stream multimedia data from a streaming server to a specific client apparatus.

However, the data communication system of the present invention utilizes novel file to group stripping programs (80, 83) in application servers (20, 20a, and 20b) and a novel group format conversion program (120) in streaming server 30, described in greater detail in FIGS. 3, 4, 6, 7, and 8. This allows the operational steps for streaming groups of data of multimedia files to client apparatuses to be divided between application servers and streaming servers. This frees up space in streaming server 30 and prevents overloading during streaming, due to receipt of a large number of client requests in streaming server 30.

As mentioned above, client apparatuses (50a, 50b, 50c, and 50d) can be, for example, personal computers, fax machines, designated hard drives, telephone interfaces, wireless telephones, radio-receivers, personal digital assistants (PDAs), or any other devices capable of receiving multimedia data. Multimedia data received at one of client apparatuses (50a, 50b, 50c, and 50d) is usually decoded and played. Microsoft® Windows® Media Technologies is a software program that can be used to decode multimedia data at client apparatuses (50a, 50b, 50c, and 50d).

Figure 2:
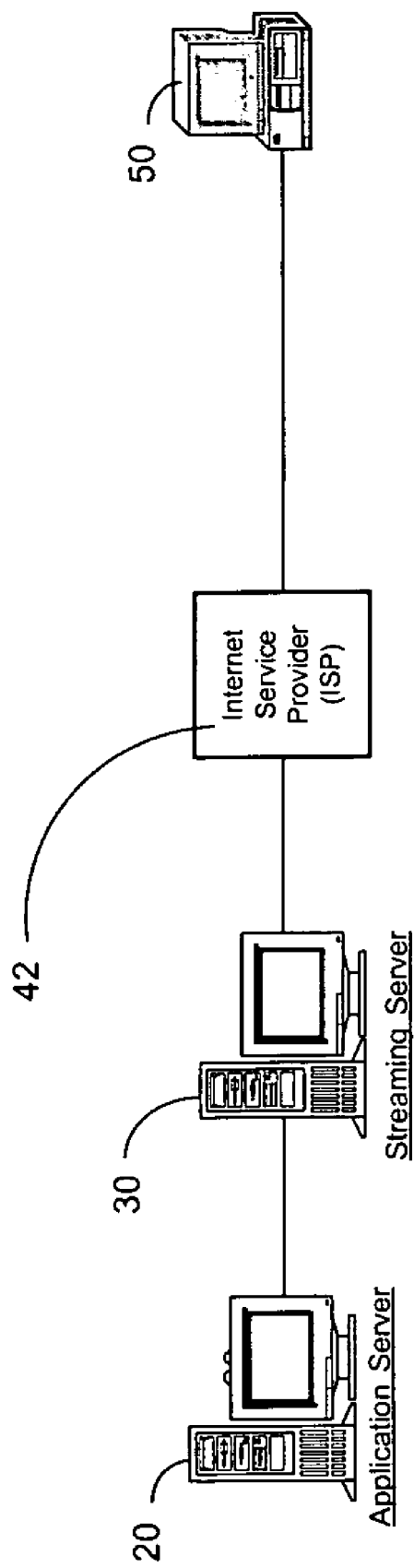
FIG. 2 is a schematic diagram illustrating a first embodiment of the present invention including an application server, a streaming server, and a client apparatus as they are interconnected over a network.

Referring to FIG. 2, a schematic diagram illustrates a first embodiment of the present invention including an application server 20, a streaming server 30, and a client apparatus 50 as they are interconnected over a network. Application server 20 is shown directly connected to streaming server 30. However, application server 20 may be connected to streaming server 30 over a local area network (LAN), a wireless network, or connected over an Internet using an Internet service provider, not shown. Streaming server 30 is shown connected to client apparatus 50 over an Internet service provider 42. However, streaming server 30 may be directly connected to client apparatus 50, connected over a wireless network, not shown, or connected to client over a Local Area Network (LAN), not shown. Internet service provider 42 may be, for example, America On Line or any other commercially available Internet service provider.

Figure 3:
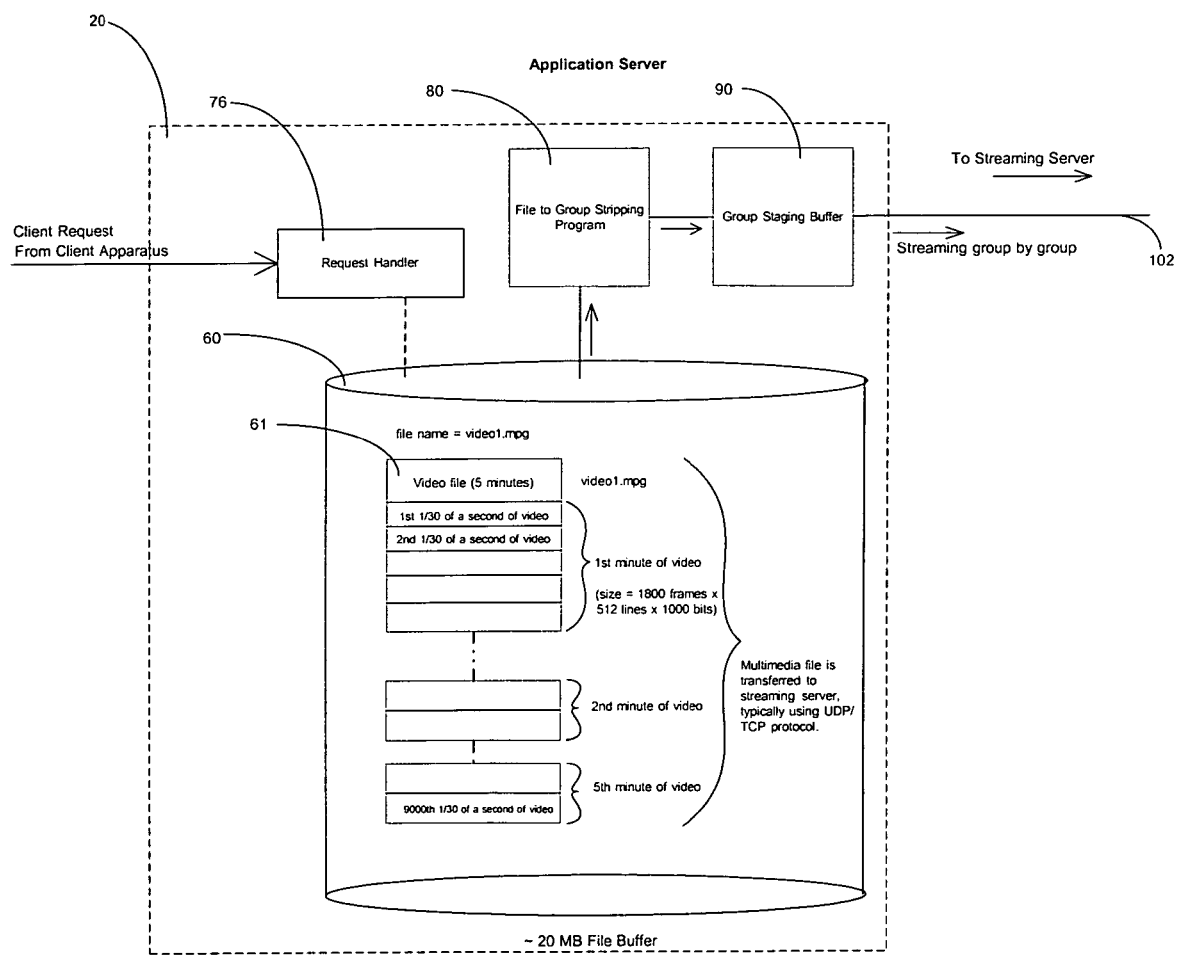
FIG. 3 is a schematic diagram illustrating application server 20, as shown in FIG. 2, in greater detail.

Application server 20 is shown in greater detail in FIG. 3. Streaming server 30 is shown in greater detail in FIG. 4. Detailed descriptions of application server 20, streaming server 30, and client apparatus 50 of FIG. 2 are the same as the detailed descriptions provided for application server 20, streaming server 30 and client apparatuses (50a, 50b, 50c, and 50d) provided with reference to FIG. 1. For simplicity, FIG. 2 shows a single application server 20 connected to a single streaming server 30, which is connected to a single client apparatus 50. However, the scope of the present invention covers data communication systems including multiple application servers, multiple streaming servers, and multiple client apparatuses interconnected over networks.

Referring to FIG. 3, a schematic diagram illustrates application server 20, as shown in FIG. 2, in greater detail. Application server 20 includes a request handler 76, a file to group stripping program 80, a group staging buffer, a clock, not shown, a data base 60, and a connector 102. A video file 61 is shown stored in database 60. Video file 61 has a file name "video1.mpg". The "mpg" extension indicates that the video file is encoded in MPEG format. Video file 61 is made up of groups of data. Each group is a frame that is 1/30 of a second of video. In this example, video file 61 is 5 minutes long, includes 1800 frames, and requires a file buffer of approximately 20 megabytes for storage.

Request handler 76 receives and manages client requests for a selected video file, such as video file 61, from client apparatus 50, shown in FIG. 2. Request handler 76 designates a client address, not shown, to which video file 61 is to be sent, based on the client request. Video file 61 is sent group by group from application server 20 to a streaming server 30, shown in FIG. 2.

As mentioned above, one group is 1/30 of a second of video, which represents one frame of video. File to group stripping program 80 is used to strip consecutive groups of data of video file 61 and send the consecutive groups to group staging buffer 90. Group staging buffer 90 temporarily stores consecutive groups before they are sent over connector 102 to streaming server 30. Video file 61 is transferred to streaming server 30, typically using a UDP/TCP protocol. Thus, application server 20 utilizes file to group stripping program 80 and group staging buffer 90 to strip and buffer consecutive groups of video file 61 before sending the consecutive groups to streaming server 30. This relieves streaming server 30 of some operational steps in sending multimedia data to client apparatus 50, allowing streaming server 30 to be used as a caching tool for sending video file 61. A clock is included in application server 20 to synchronize the transfer of groups of multimedia files to streaming server 30.

Figure 4:
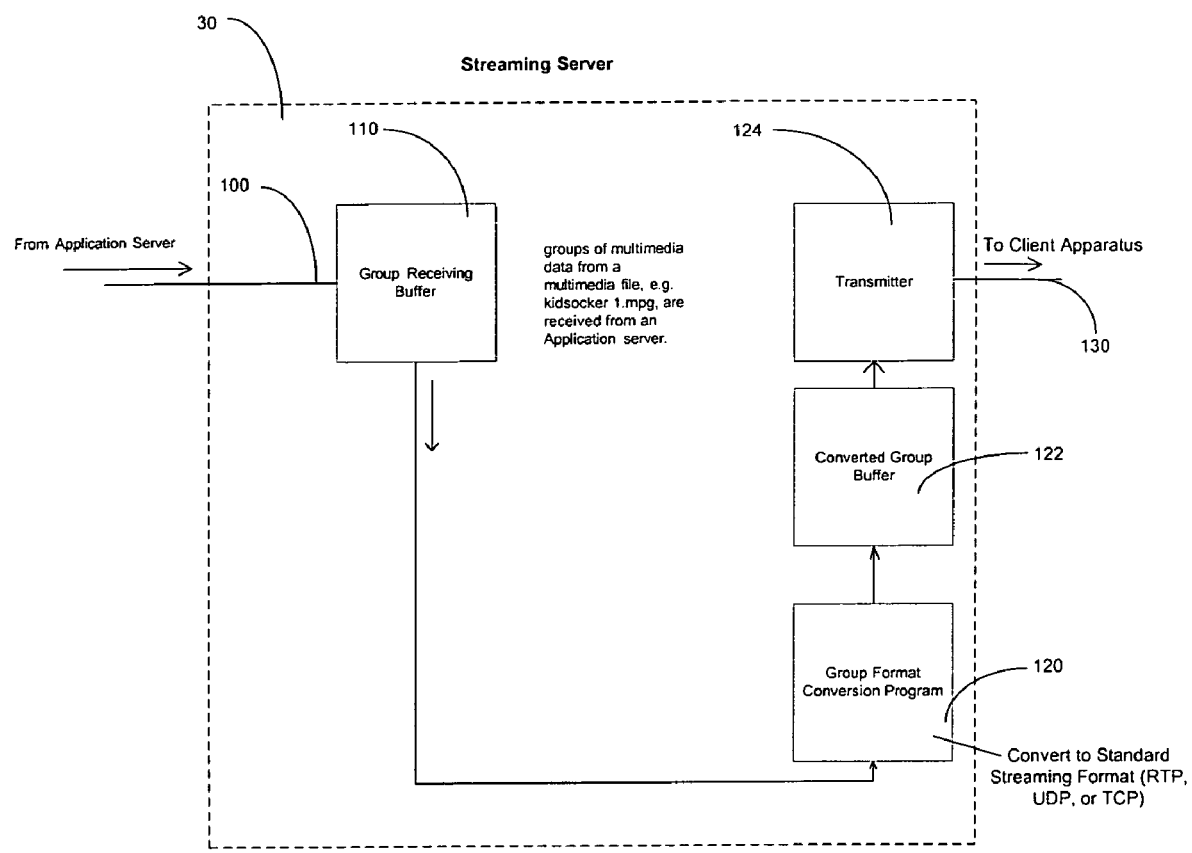
FIG. 4 is a schematic diagram illustrating streaming server 30, as shown in FIG. 2, in greater detail.

Referring to FIG. 4, a schematic diagram illustrates streaming server 30, as shown in FIG. 2, in greater detail. Streaming server 30 includes a connector 102, a group receiving buffer 110, a group format conversion program 120, a converted group buffer 122, a transmitter 124, and a connector 130. Group receiving buffer 110 acts as a storage area for receiving consecutive groups of data of video file 61 over connector 102 from application server 20. Group receiving buffer 110 is preferably an elastic buffer to accommodate different size groups of multimedia data.

For example, referring back to FIG. 9, video file 200 is made up of groups of data with each group representing one frame of video data. As shown, frame #1 has 50 kB of multimedia data, while frame #2 has only 1 kB of multimedia data. Thus, it is desirable to use an elastic buffer to accommodate different size groups of data. Further, an elastic buffer facilitates streaming of a larger variety of multimedia file types, such as files containing several streams of different media types multiplexed together.

The consecutive groups in group receiving buffer 110 then flow to group format conversion program 120, where each group is converted to a standard streaming format. Examples of standard streaming formats are RTP, UDP, and TCP. The converted groups are then stored in converted group buffer 122. Transmitter 124 then sends the converted groups to client apparatus 50, shown in FIG. 2. The converted groups are streamed group by group over connector 130. Streaming server 30 receives a client address, not shown, over connector 102 from application server 20, and uses the address to direct the sending of video file 61 to client apparatus 50. Transmitter 124 can be a standard network interface card, a transceiver, a medium access unit, or any other device capable of transmitting multimedia data over a network.

Figure 5:
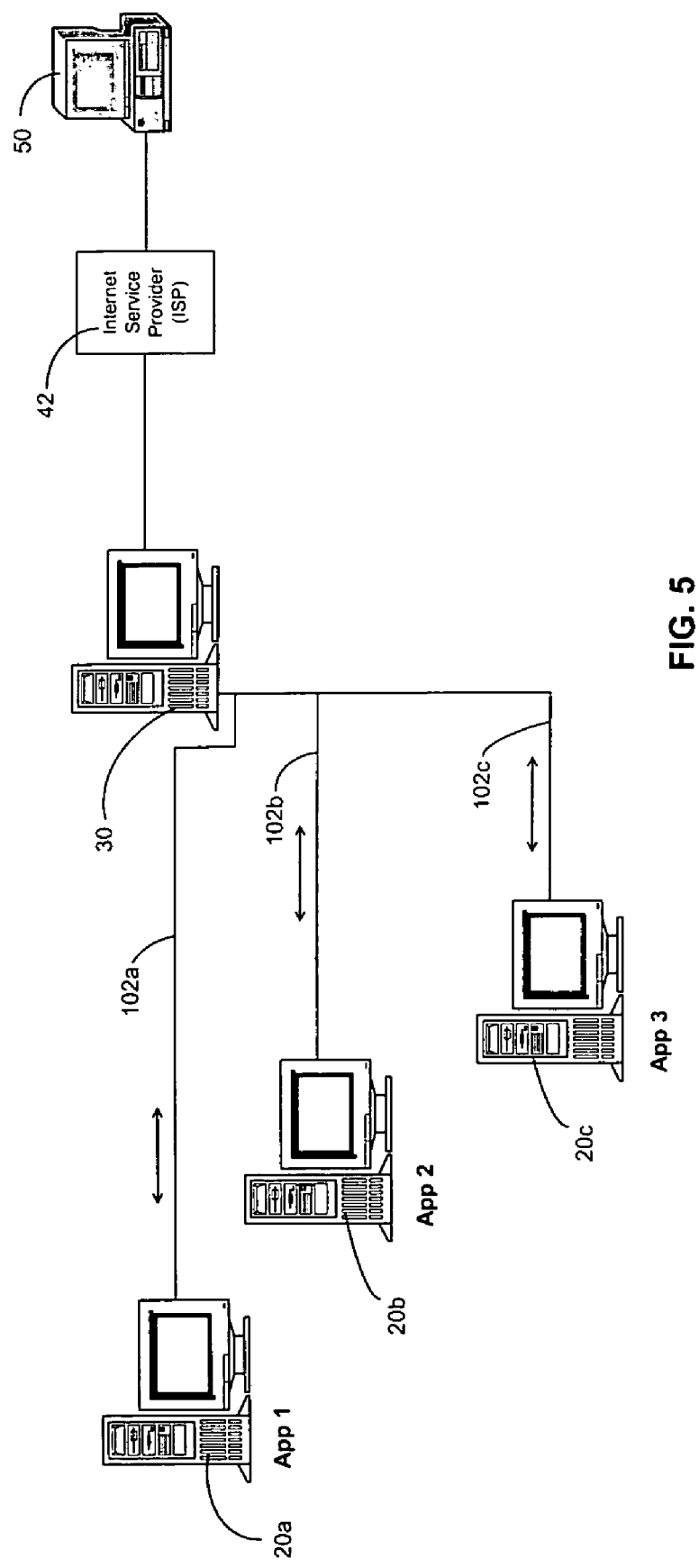
FIG. 5 is a network diagram illustrating a second embodiment of the present invention in which multiple application servers, a streaming server, and a client apparatus are interconnected over networks.

Referring to FIG. 5, a network diagram illustrates a second embodiment of the present invention in which multiple application servers, a streaming server, and a client apparatus are interconnected over networks. A plurality of application servers (20a, 20b, and 20c) are connected to a streaming server 30. As shown, application server 20a is connected to streaming server 30 over connector 102a. Application server 20b is connected to streaming server 30 over connector 102b. Application server 20c is connected to streaming server 30 over connector 102c. Streaming server 30 is shown connected to client apparatus 50 via Internet service provider 42. Application servers (20a, 20b and 20c) are shown directly connected to streaming server 30.

However, application servers (20a, 20b and 20c) may be connected to streaming server 30 using a local area network (LAN), an Internet service provider (ISP), or a wireless network. Similarly, client apparatus 50 may be connected to streaming server 30 using a LAN, an ISP, a direct connector, or a wireless network. For simplicity, FIG. 5 shows only one client apparatus 50, but the scope of the present invention is not limited to data communication systems having only a single client apparatus. The data communication system of FIG. 5 allows a client using client apparatus 50 to receive multimedia data from multimedia files stored in any one of application servers (20a, 20b, 20c). Application servers (20a and 20b) are described in greater detail in FIG. 6. Streaming server 30 is described in greater detail in FIG. 7. Client apparatus 50 of FIG. 5 can be, for example, a personal computer, a fax machine, a designated hard drive, a telephone interface, a wireless telephone, a radio-receiver, a personal digital assistant (PDA), or any other device capable of receiving multimedia data.

Figure 6:
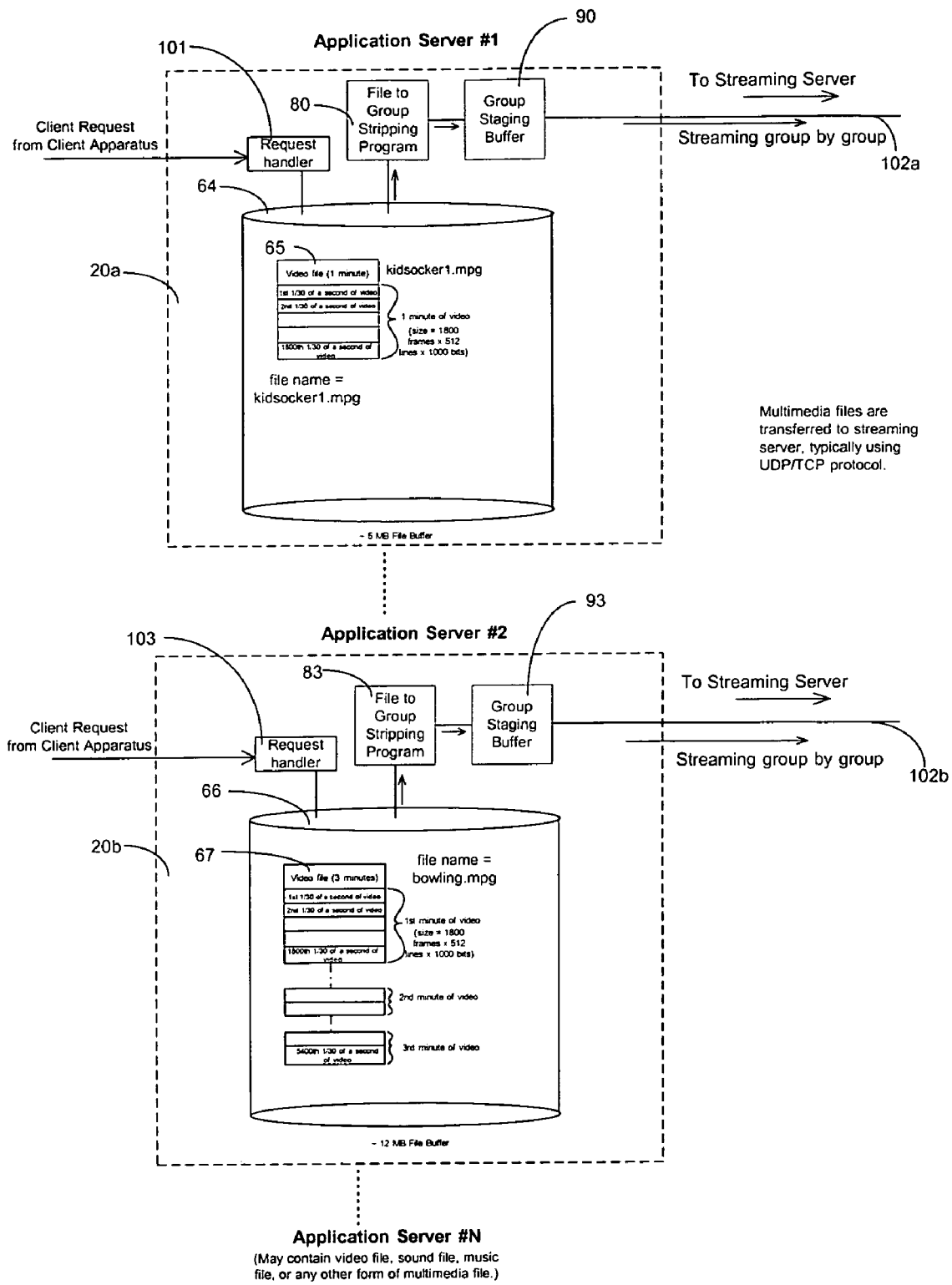
FIG. 6 is a schematic diagram illustrating application servers (20a and 20b), as shown in FIG. 5, in greater detail.

Referring to FIG. 6, a schematic diagram illustrates application servers (20a and 20b), as shown in FIG. 5, in greater detail. Application server 20a includes a request handler 101, a file to group stripping program 80, a group staging buffer 90, a clock, not shown, a database 64, and a connector 102a. Database 64 stores a video file 65. Video file 65 has a file name "kidsoccer1.mpg". The "mpg" extension indicates that video file 65 is encoded in an MPEG format. Video file 65 is made up of groups of data. In this example, each group is a video frame which represents 1/30 of a second of video and video file 65 includes 1800 frames. Video file 65 is one minute long and requires a file buffer size of approximately 5 megabytes. File to group stripping program 80 is used to strip consecutive groups of data of video file 65 and send the stripped groups to a group staging buffer 90. Group staging buffer 90 is used to temporarily store the consecutive groups before the consecutive groups are transferred over connector 102a to streaming server 30, shown in FIG. 5. Request handler 101 receives and manages a client request for a selected video file, such as video file 65, from a client apparatus 50, shown in FIG. 2. Request handler 101 also reads a client address, not shown, from the client request to which video file 65 is to be sent. The client's address is transferred to streaming server 30, to allow streaming server 30 to direct the consecutive groups to the address of client apparatus 50.

Similarly, application server 20b includes a request handler 103, a file to group stripping program 83, a group staging buffer 93, a clock, not shown, a data base 66, and a connector 102b. Database 66 stores a video file 67. Video file 67 has a file name "bowling.mpg". Video file 67 is 3 minutes long, encoded in MPEG format, and requires a file buffer size of approximately 12 megabytes. File to group stripping program 83 is used to strip consecutive groups of data from video file 67 and send the stripped groups to group staging buffer 93. Group staging buffer 93 temporarily stores the consecutive groups before the consecutive groups are transferred over connector 102b to streaming server 30. Consecutive groups of video file 67 are transferred group by group to streaming server 30, typically using UDP/TCP protocol. Request handler 103 also reads a client address, not shown, from the client request to which video file 67 is to be sent. The client's address is then transferred to streaming server 30, to allow streaming server 30 to direct the consecutive groups to the address of client apparatus 50. For both applications server (20a, 20b) a clock is included to synchronize the transfer of groups of multimedia files to streaming server 30.

Figure 7:
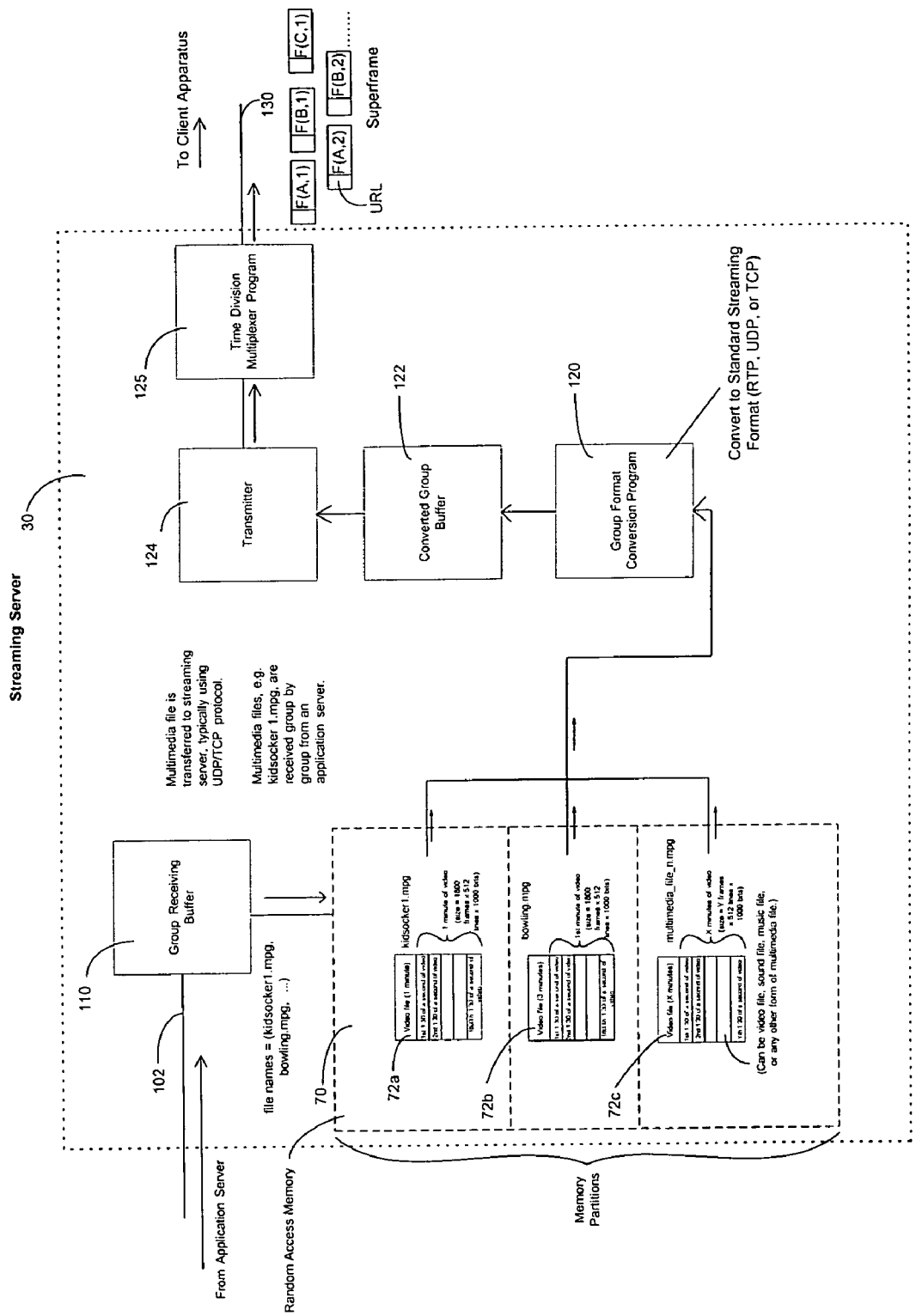
FIG. 7 is a schematic diagram illustrating streaming server 30, as shown in FIG. 5, in greater detail.

Referring to FIG. 7, a schematic diagram illustrates streaming server 30, as shown in FIG. 5, in greater detail. Streaming server 30 includes a group receiving buffer 110, a random access memory 70, a group format conversion program 120, a converted group buffer 122, a transmitter 124, a time-division multiplexer program 125, and connectors (130, 102). Group receiving buffer 110, receives consecutive groups of data from one of application servers (20a, 20b), shown in FIG. 6, depending upon which of application servers (20a, 20b) contains a requested video file. As described above with reference to FIG. 4, group receiving buffer 110 is preferably an elastic buffer to accommodate different size groups of data of a requested video file.

Consecutive groups of data of the requested video file are then stored in random access memory 70. As shown, random access memory 70 contains a plurality of memory partitions (72a, 72b, and 72c). Memory partitions (72a, 72b, and 72c) act as temporary storage for groups of data for requested video files before the groups are processed by group format conversion program 120.

Memory partition 72a stores consecutive groups of data for the requested video file entitled "kidsocker.mpg". Memory partition 72b stores consecutive groups of data of the requested video file entitled "bowling.mpg". Memory partition 72c stores consecutive groups of data of the requested video file entitled "mulitmedia_file n.mpg". Time-division multiplexer program 125 designates which requested file and an order of consecutive groups of the designated requested file to be processed and sent by streaming server 30. The consecutive groups designated to be process in streaming server 30 are first sent to group conversion program 120, which converts the consecutive groups into a standard streaming format readable by client apparatus 50, shown in FIG. 5. Examples of standard streaming formats are RTP, UDP, or TCP. The converted groups are then temporarily stored in converted group buffer 122. Time-division multiplexer program 125 then designates the order in which the converted groups are sent to client apparatus 50 by transmitter 124. Transmitter 124 can be a standard network interface card, a transceiver, a medium access unit, or any other device capable of transmitting multimedia data over a network.

Requested files are sent to client apparatus 50 group by group over connector 130. In this example, each group represents a frame of a requested video file. Consecutive video frames of the requested video file are shown formatted as a super frame. FIG. 7 shows an example super frame format in which each frame contains a URL address of a requesting client and specific frame designator coordinates to identifying each frame, such as frame F(A, 1). In this example, a group is one frame of a requested video file, however, a group may consist of multiple frames of a video file. In this example, only one client apparatus 50 is shown. However, time-division multiplexer program 125 is capable of handling multiple client apparatuses and multiple video files sent to the multiple client apparatuses.

Figure 10:
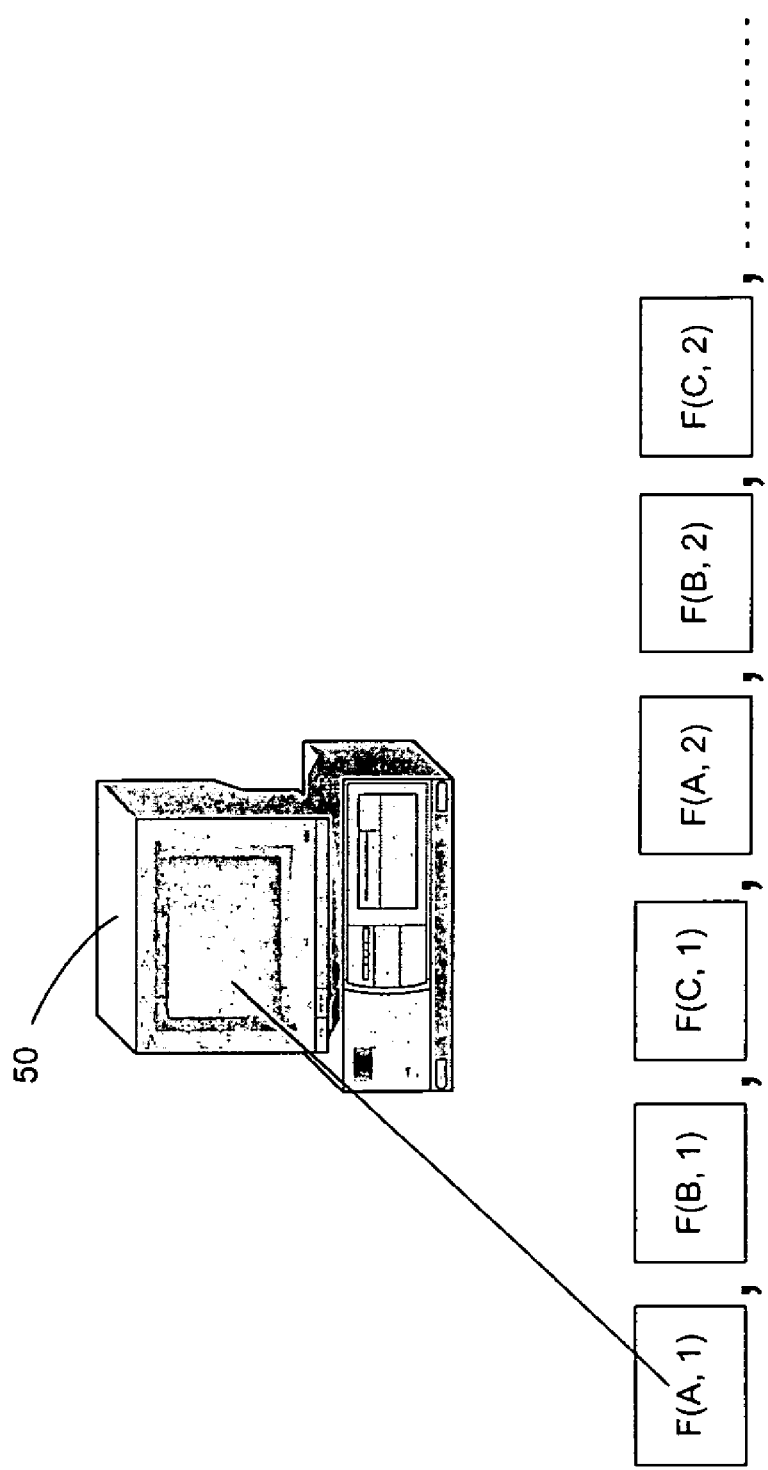
FIG. 10 is a diagram illustrating a sequence in which video frames of the super frame of FIG. 7 are received at client apparatus 50, as shown in FIG. 5.

Referring to FIG. 10, a diagram illustrates a sequence in which video frames of the superframe of FIG. 7 are received at client apparatus 50, as shown in FIG. 5. FIG. 10 shows that client apparatus 50 receives consecutive frames from streaming server 30, shown in FIG. 7 in the order in which the superframe is output from streaming server 30. For example, frame F(A, 1) may correspond to the first frame of the video file entitled "kidsocker1.mpg", shown in FIG. 7. Frame F(B, 1) may correspond to the first frame of the video file entitled "bowling.mpg" of FIG. 7. Frame F(C, 1) may correspond to the first frame of the video file entitled "multimedia_file_n.mpg" of FIG. 7. Similarly, frames F(A, 2), F(B, 2), and F(C, 2) may correspond to the second frames of the respective video files. Thus, in this example, client apparatus 50 would receive the first frame for each requested video file and then receive the second frame for each requested video file. Frames would be received in order until all frames for all three requested videos were received by client apparatus 50.

Figure 8:
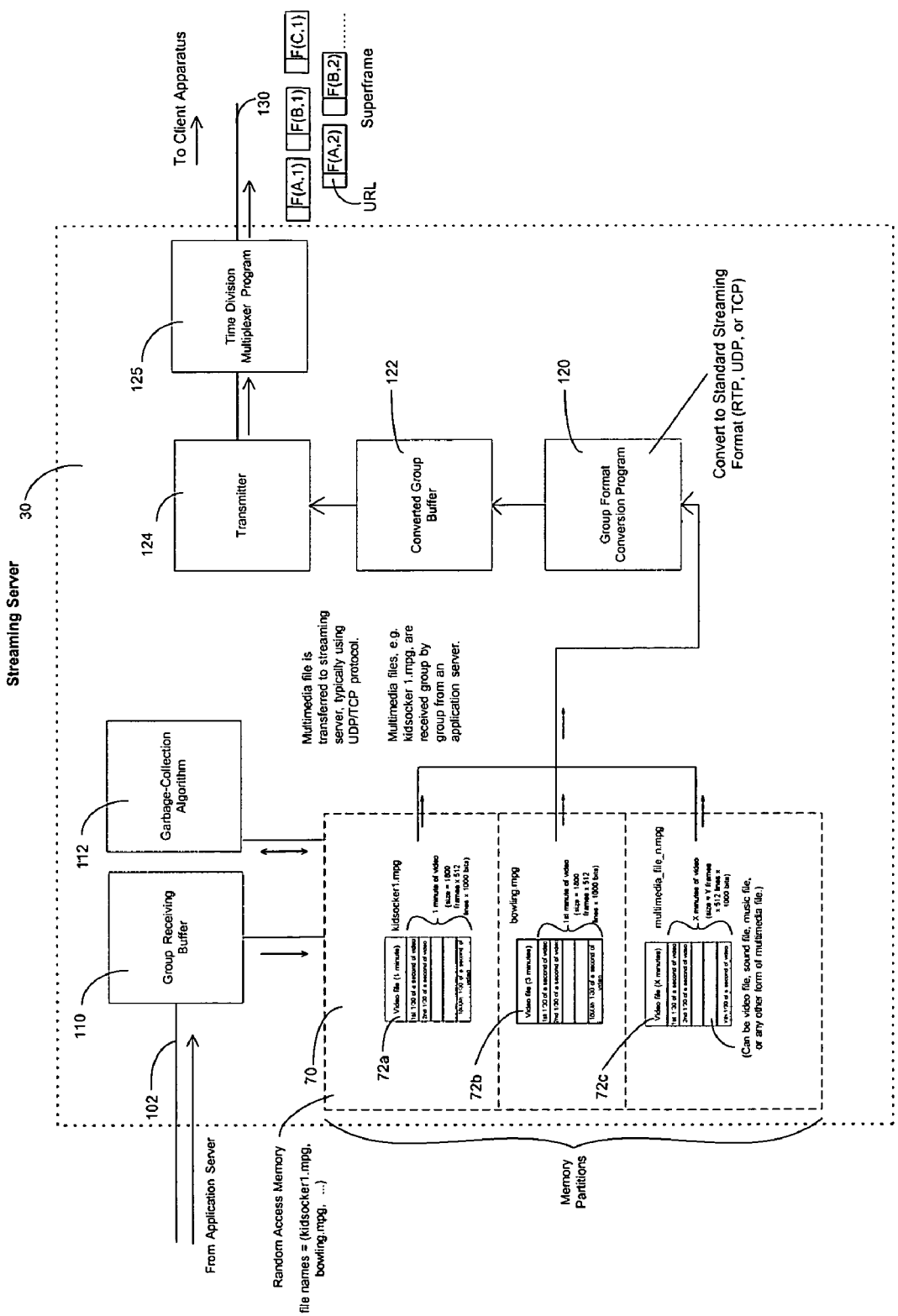
FIG. 8 is a schematic diagram illustrating streaming server 30, as shown in FIG. 5, in a third embodiment of the present invention.

Referring to FIG. 8, a schematic diagram illustrates streaming server 30 in a third embodiment of the present invention. Streaming server 30 contains all of the elements shown in FIG. 7 plus an added garbage-collection algorithm 112. The operation of streaming server 30, shown in FIG. 8 is the same as the operation of streaming server 30, shown in FIG. 7, except for the added garbage-collection algorithm 112. Therefore, only the operation of garbage-collection algorithm 112 will be described.

Figure 13:
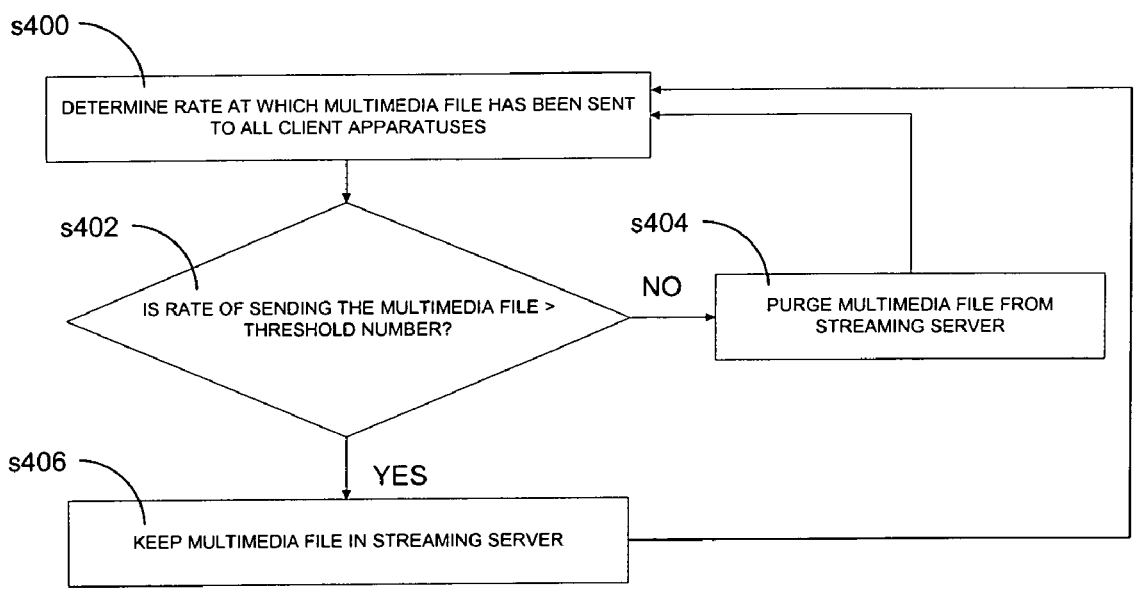
FIG. 13 is a diagram illustrating the sequence of operational steps for a method for purging files from a steaming server according to a garbage-collection algorithm.

Referring now to FIG. 13, the diagram illustrates the sequence of operational steps for a method for purging files from a steaming server according to garbage-collection algorithm 112. In a step s400, garbage collection algorithm 112 determines a rate at which a requested multimedia file, for example, video file 200 of FIG. 9, has been sent to all client apparatuses in the data communication system of the present invention. In this example there is only one client apparatus 50, shown in FIG. 5. However, multiple client apparatuses (50a, 50b, 50c and 50d) may be connected to streaming server 30, as shown in FIG. 1. The rate at which a multimedia file has been sent to all client apparatuses represents a number of times that a specific multimedia file has been sent to all client apparatuses over a predetermined time period. For example, the time period may be 1 week and the multimedia file may be video file 200 of FIG. 9. Client apparatus 50 of FIG. 5 may be the only apparatus to which video file 200 was sent and video file 200 may have been sent 3 times during the 1 week time period. Thus, the rate for video file 200 would be 3 times/week. The rate can be a number of times per week, per day, per year, per hour, or any other selected time period.

Next, in a step s402, garbage-collection algorithm 112 determines if the rate of sending the requested multimedia file is greater than a predetermined threshold number. The threshold number is a whole number, such as 2. In this example, the rate of sending video file 200 is 3 times/week and the threshold number is 2. Thus, in this example, the process flows to a step s406. In step s406 garbage-collection algorithm 112 determines that the requested multimedia file should be kept in streaming server 30, shown in FIG. 8. Alternatively, if the rate of sending a requested multimedia file is less than or equal to a threshold number the process flows to a step s404. At step s404 garbage-collection algorithm 112 determines that the requested multimedia file should be purged from streaming server 30 of FIG. 8.

The threshold number relates to the popularity of the requested multimedia file, allowing only the most popular multimedia files to remain on streaming server 30. Thus, garbage collection algorithm 112 purges less popular requested multimedia files to conserve memory space in streaming server 30. This reduces the chance of overloading steaming server 30 during streaming, when a large number client requests are received.

Referring back to FIG. 9, the diagram illustrates video file 200 encoded in MPEG format. Video file 200 has the file name "video1.mpg". The "mpg" extension indicates that it is formatted in MPEG format. Video file 200 is made up of a plurality of groups of data. Each group is a frame. Each frame begins with the starting signal designated by an "s" followed by a number. Thus, frame #1 contains all of the data between starting signal s1 and starting signal s2, which is 50 kilobytes of data. As shown, different frames can be different sizes. Frame #1 is 50 kilobytes. Frame #2 contains all of the data between starting signal s2 and starting signal s3, which is only 1 kilobyte in size. Thus, the size of each frame, as well as the starting and stopping points of each frame can be determined by tracking the starting signals for each frame. Further, video file 200 is shown as 9 megabytes in size and made up of 90,000 frames.

Figure 14:
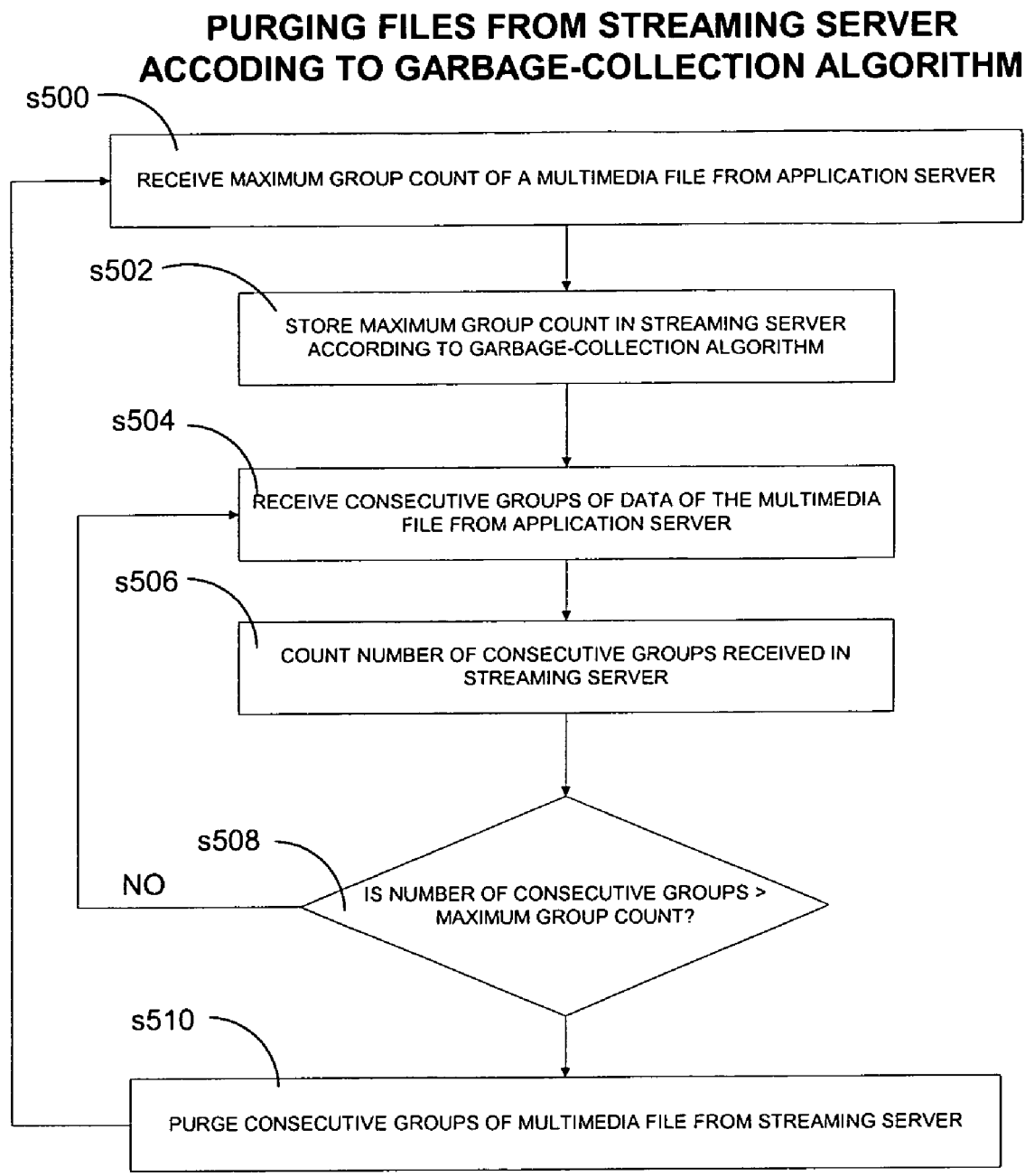
FIG. 14 is a diagram illustrating the sequence of operational steps for another method for purging files from a streaming server according to a garbage-collection algorithm.

Referring now to FIG. 14, a diagram illustrates a sequence of operational steps for another method for purging files from a streaming server according to the garbage-collection algorithm 112 of FIG. 8. In a step s500, garbage-collection algorithm 112 receives a maximum group count of a requested multimedia file from one of application servers (20a, 20B), shown in FIG. 5. Next, in a step s502 the maximum group count is stored in streaming server 30 of FIG. 5, according to garbage-collection algorithm 112. The maximum group count corresponds to a number of groups of data that makeup a requested multimedia file. For example, video file 200 of FIG. 9 is made up of 90,000 frames. Each group is one frame, so there are 90,000 groups in video file 200. In this example, streaming server 30 would receive video file 200 from one of application servers (20a or 20b). The application server sending video file 200 to streaming server 30 would determine the maximum group count of video file 200 based on the number of frames. This group count size is sent to streaming server 30 and garbage collection algorithm 112 receives and stores the maximum group count.

In this example, the process then flows to a step s504, where streaming server 30 receives consecutive groups of data of video file 200 from one of application servers (20a or 20b). After receiving each consecutive group of video file 200, the process flows to a step s506, where garbage-collection algorithm 112 counts a number of consecutive groups received in streaming server 30. The process then flows to a step s508, where garbage-collection algorithm 112 determines if the number of consecutive groups is equal to the maximum group count. If the number of consecutive groups is equal to the maximum group count the process flows to a step s510. In step s510, garbage-collection algorithm 112 purges consecutive groups of video file 200 from streaming server 30. Alternatively, if the number of consecutive groups is less than the maximum group count the process flows back to step s504. Steps s504 through s508 are repeated until the number of consecutive groups is equal to the maximum group count. This allows copies of requested multimedia files transferred to streaming server 30 from one of application servers (20a, 20b) of FIG. 5 to be purged after transfer, which conserves storage space in streaming server 30.

Figure 11:
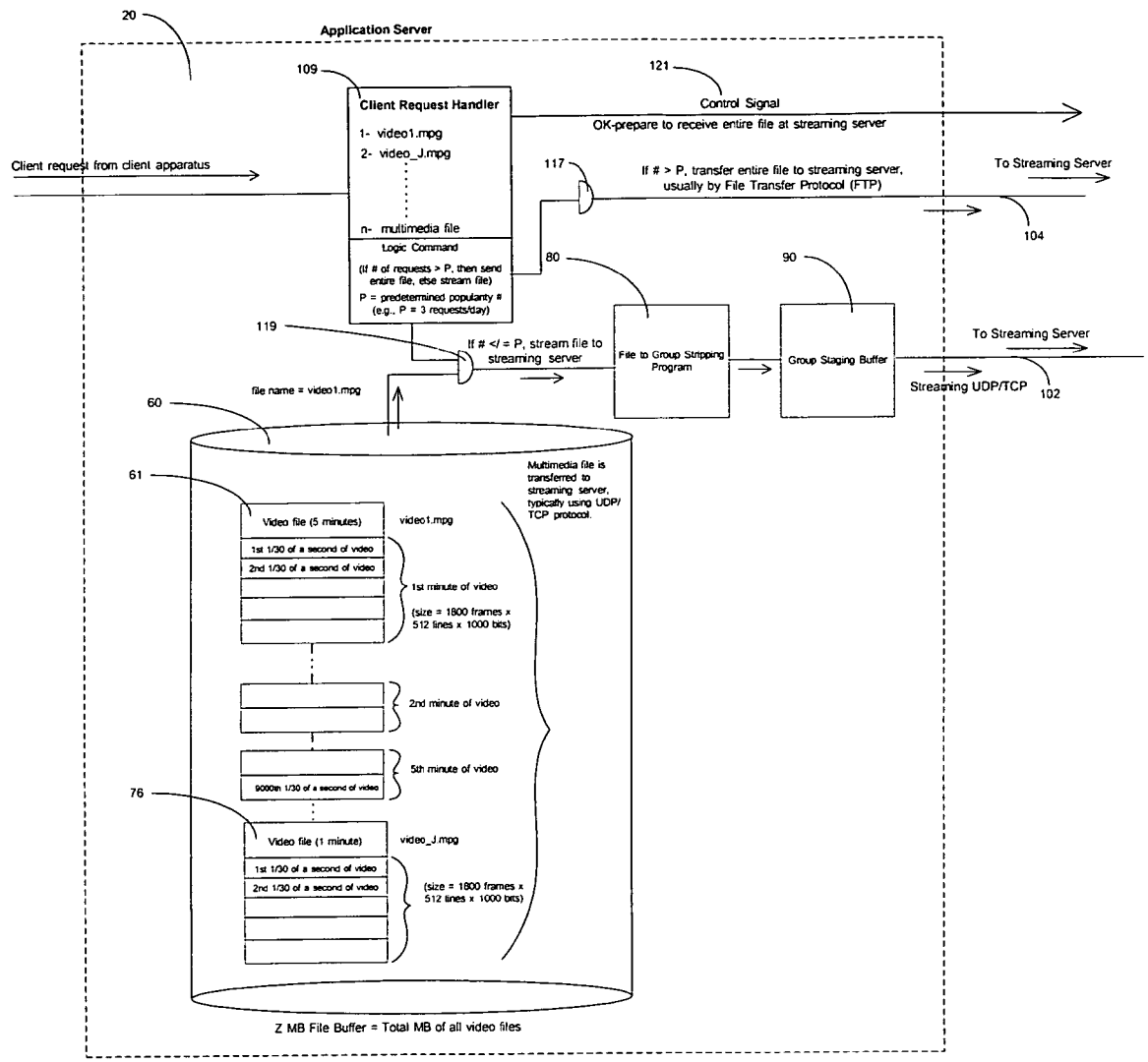
FIG. 11 is a diagram illustrating a fourth embodiment of the present invention, in which a application server 20, shown in FIG. 5, selectively transfers entire multimedia files to streaming server 30 of FIG. 5, based on a number of client requests received in a request handler.

Referring to FIG. 11, a diagram illustrates a fourth embodiment of the present invention, in which application server 20, shown in FIG. 5, selectively transfers entire multimedia files to streaming server 30 of FIG. 5, based on a number of client requests received in request handler 109 of FIG. 11.

Client request handler 109 is made up of two logic circuits (117 and 119). In this example, client request handler 109 receives a client request from client apparatus 50, as shown in FIG. 5. Logic circuits (117 and 119) determine if an entire requested multimedia file should be transferred to streaming server 30 or if the requested multimedia file should be streamed group by group to streaming server 30. Client request handler 109 is programmed to count a number of requests for a multimedia file from all client apparatuses, such as client apparatus 50 of FIG. 5. Further, client request handler 109 is programmed to compare the number of requests for the multimedia file to a threshold predetermined popularity number.

If the number of requests is less than the threshold predetermined popularity number logic circuit 119 determines that the requested multimedia file should be transferred group by group to streaming server 30 and begins transferring the requested file group by group. Alternatively, if the number of requests is greater than the threshold predetermined popularity number, logic circuit 117 determines that the entire requested multimedia file is to be transferred to streaming server 30 and transfers the entire file at a preprogrammed time. The preprogrammed time can be set for a time when a number of requests for all multimedia files is below a certain amount or at a specific time of the day. Further, logic circuit 117 can receive a transfer time from one of application servers (10a, 10b).

For example, FIG. 11 shows a database 60 including a video file 61 and a video file 76. In this example we set the threshold predetermined popularity number to be 3 times per day. If client request handler 109 receives more than 3 requests per day for video file 61, logic circuit 117 will transfer the entire video file 61 to streaming server 30. Alternatively, if the number of requests for video file 61 is less than or equal to the threshold predetermined popularity number (3 times per day) logic circuit 119 will transfer video file 61 group by group to streaming server 30. The operations of file to group stripping program 80 and group staging buffer 90 are the same as described with reference to FIG. 3 and FIG. 6. Logic circuit 117 transfers entire multimedia files over connector 104 to streaming server 30. Logic circuit 119 streams multimedia files to streaming server 30 over connector 102. The sequence of operational steps for client request handler 109 are described in greater detail in FIG. 15.

Figure 15:
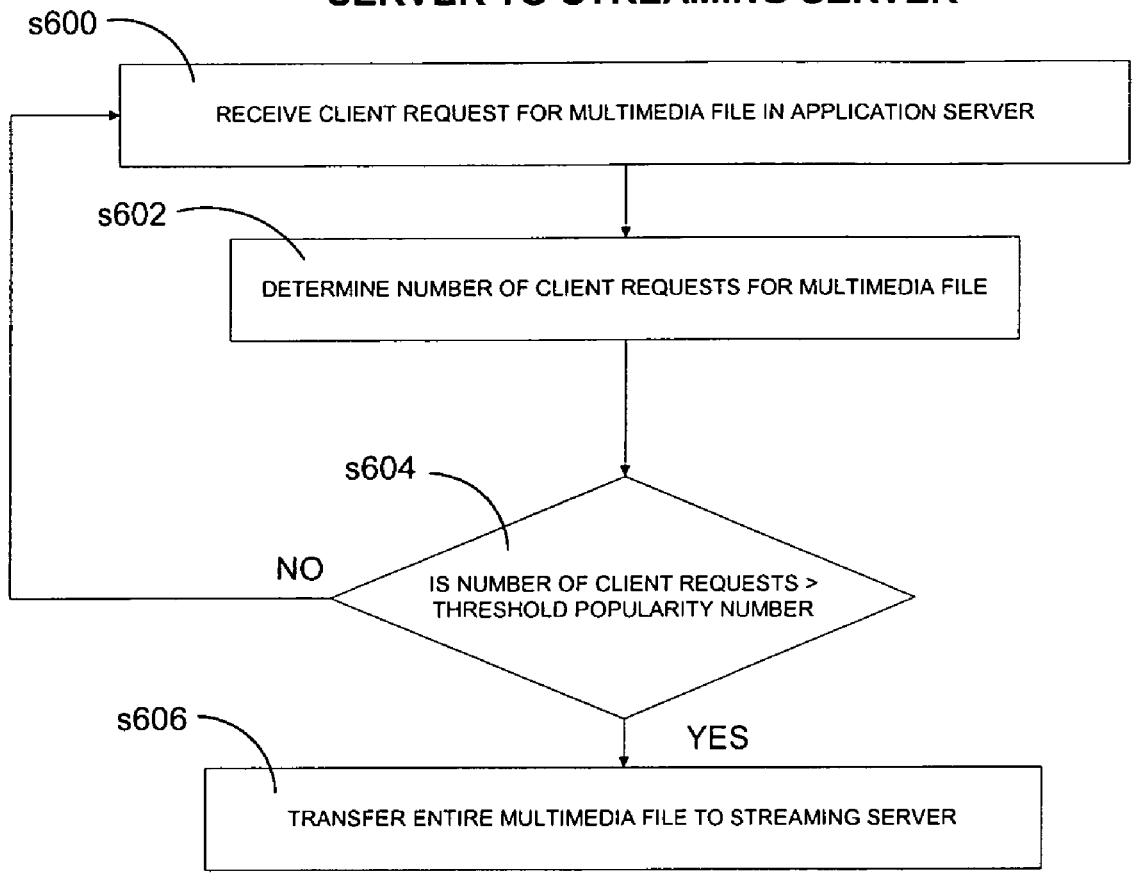
FIG. 15 is a diagram illustrating the sequence of operational steps for a method for transferring entire files from an application server to a streaming server.

Referring to FIG. 15, a diagram illustrates the sequence of operational steps for a method for transferring entire files from an application server to a streaming server, using request handler 109 of FIG. 11. First, in a step s600 request handler 109 receives a client request for a multimedia file located in one of application servers (20a, 20b). Next, in a step s602 client request handler 109 determines a number of client requests for the multimedia file. This number of requests is the number of requests from all client apparatuses. In this example, there is only one client apparatus 50, shown in FIG. 5. However, request handler 109 is capable of counting the number of requests for a multimedia file from a plurality of client apparatuses.

Next, the process flows to a step s604, where request handler 109 compares the number of client requests to a threshold popularity number. The threshold number is a whole number, such as 3. If the number of client requests is greater than the threshold popularity number, the process flows to a step s606. In step s606 request handler 109 determines that the entire multimedia file is to be transferred to streaming server 30 and arranges for the transfer of the entire file at a predetermined time. The request handler can be programmed to transfer the file at a specific time or transfer the file at a time when the number of requests is small. Alternatively, in step s604, if the number of client requests is less than or equal to the threshold popularity number the process flows back to step s600. Steps s600 through s604 are repeated until the number of client requests is greater than the threshold popularity number. This process allows the most popular streamed files to be copied to the streaming server and less frequently accessed files to be copied only as needed, which frees up storage space in streaming server 30.

Further, this process allows streaming 30 to send popular files directly to client apparatuses rather than streaming from application servers, which would result in streaming servers and application servers competing for server resources. Further, it avoids time synchronization problems due to differences between transfer rates from application servers to streaming servers versus sending rates from streaming servers to apparatuses.

Figure 16:
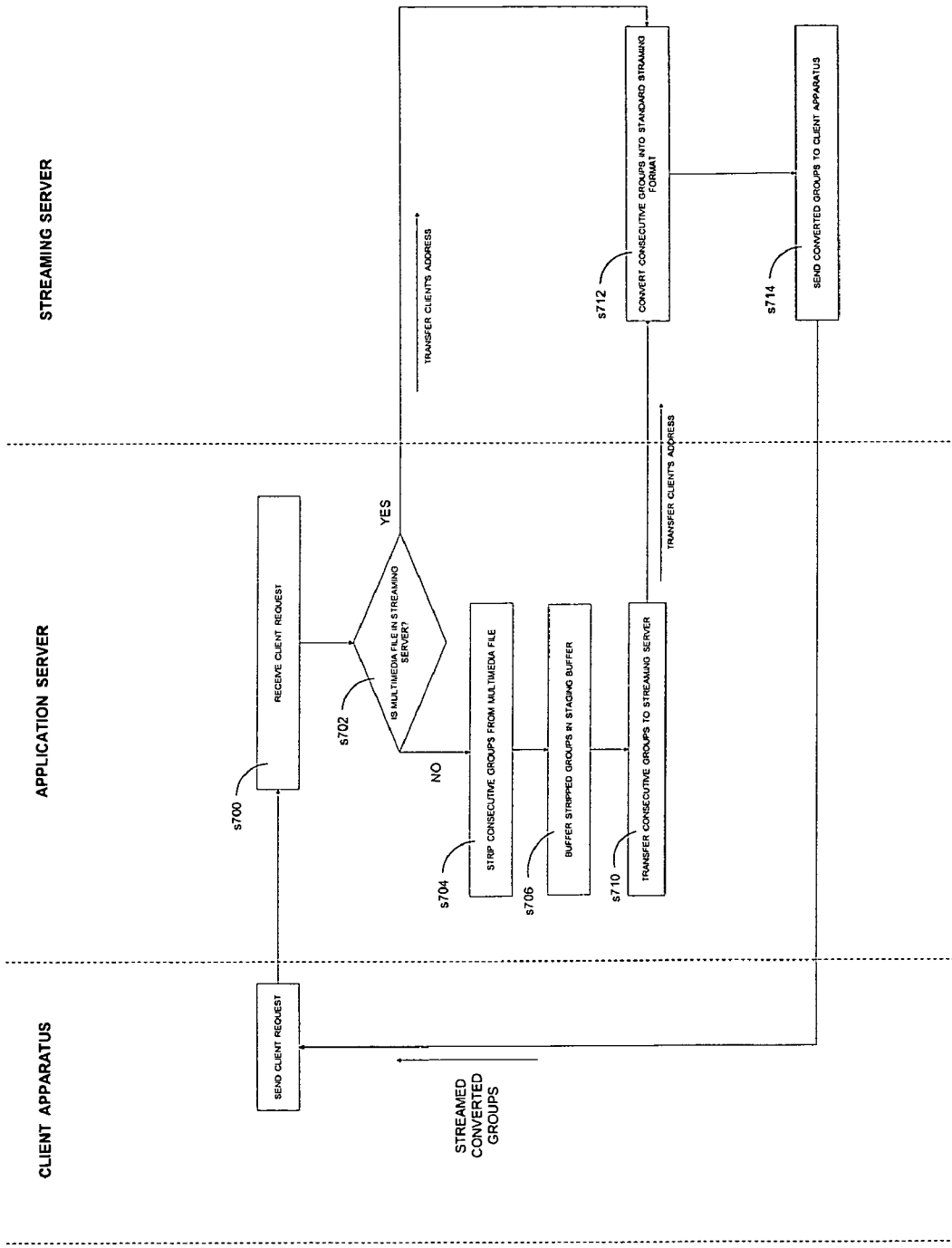
FIG. 16 is a swim lane diagram illustrating the sequence of operational steps for a data communication system for selectively streaming multimedia files from application servers and streaming servers to a client apparatus.

Referring to FIG. 16, a swim lane diagram illustrates the sequence of operational steps for a data communication system for selectively streaming multimedia files from application servers and streaming servers to a client apparatus, as shown in FIG. 2 and FIG. 5. First, in a step s700 an application server receives a client request from a client apparatus. The client request corresponds to a specific multimedia file. The process then flows to a step s702, where the application server determines if the requested multimedia file is located in a streaming server. If the requested multimedia file is located in the streaming server, the process then flows to a step s712, where the streaming server converts consecutive groups of multimedia data of the requested multimedia file into a standard streaming format. As mentioned above standard streaming formats include RTP, UDP, and TCP formats. The process then flows to a step s714, where the streaming server sends the converted groups to the client apparatus. This concludes the process.

Alternatively, if in step s702 the application server determines that the multimedia file is not located in the streaming server the process flows to a step s704. In step s704, the application server strips consecutive groups of multimedia data of the requested multimedia file. The process then flows to a step s706, where the application server buffers the stripped groups in a staging buffer. Next, the process flows to a step 710, where the application server transfers consecutive groups to a streaming server. The process then flows to step s712, where the streaming server converts consecutive groups of the multimedia data into a standard streaming format. The process then flows to step s714 where the streaming server sends the converted groups to the client apparatus to complete the process. Thus, this process allows multimedia files to be selectively streamed from application servers or streaming servers.

Figure 12:
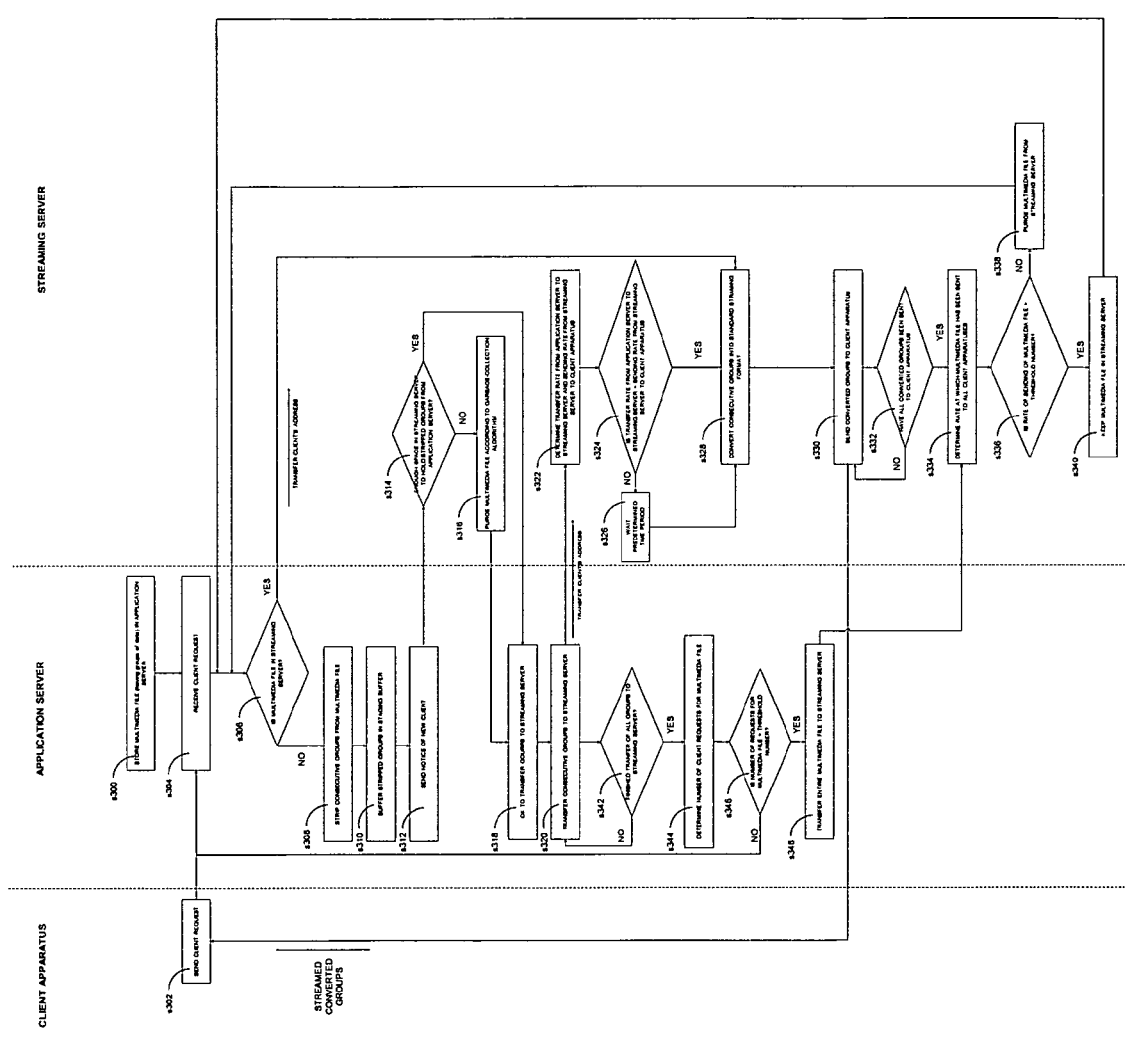
FIG. 12 is a swim lane diagram illustrating the sequence of operational steps carried out by client apparatuses, application servers, and streaming servers, shown in FIG. 2 and FIG. 5.

Referring to FIG. 12, a swim lane diagram illustrates the sequence of operational steps carried out by client apparatuses, application servers, and streaming servers, shown in FIG. 2 and FIG. 5. First, in a step s300 a multimedia file having groups of data is stored in an application server. Next, in a step s302 a client apparatus sends a client request to the application server. Next, in a step s304, the application server receives the client request sent in step s302. The client request corresponds to the multimedia file stored in step s300. The process then flows to a step s306, where the application server determines if the multimedia file requested is located in a streaming server. If the requested multimedia file is not located in a streaming server, the process flows to a step s308. In step s308, the application server strips consecutive groups of the multimedia file stored in the application server.

The process then flows to a step s310, where the stripped groups are buffered in a staging buffer in the application server. Next, in a step s312 the application server sends notice of a new client to the streaming server. The process then flows to a step s314, where the streaming server determines if there is a enough space in the streaming server to hold the stripped groups to be sent from the application server. If the streaming server determines that there is not enough space to hold the stripped groups to be sent from the application server the process flows a step s316. In step s316, multimedia files are purged according to a garbage-collection algorithm 112, shown in FIG. 11 to free up space in the streaming server. The process then flows to a step s318, where a message is sent from the application server to the streaming server indicating that it is ok to transfer the groups from the application server to the streaming server. The process then flows to a step s320, where the application server transfers consecutive groups of the multimedia file to the streaming server. Next, in a step s322, the streaming server determines a transfer rate of groups from the application server to the streaming server and a sending rate of groups from the streaming to the client apparatus.

The process then flows to step s324, where the streaming server determines if the transfer rate from the application server to the streaming server is greater than the sending rate from the streaming server to the client apparatus. If the transfer rate is less than the sending rate the process flows to a step s326, where the streaming server waits for a predetermined time period before advancing to a step s328. After waiting a predetermined time period the process flows to step s328, where the streaming server converts consecutive groups into a standard streaming format readable by the client apparatus. The process then flows to a step s330 where the streaming server sends converted groups to the client apparatus. Groups are consecutively streamed from the streaming server to the client apparatus.

Alternatively, if in step s306 the application server determines that the multimedia file is located in the streaming server the process flows directly to steps s328 and s330 and the converted groups of the multimedia file are streamed directly from the streaming server to the client apparatus. Each time that the application server transfers a consecutive group to the streaming server, the process flows to a step s342, where the application server checks to see if all groups of the multimedia file have been transferred to the streaming server. If all groups have been transferred to the streaming server the process flows to a step s344, where the application server determines the number of client requests for the multimedia file.

Alternatively, if the application server determines that not all of the groups have been transferred to the streaming server the process flows back to step s320 and steps s320 and s342 are repeated until all groups have been transferred to the streaming server. Returning now to step s344, the process then flows to a step s346, where the application server determines if the number of requests for the multimedia file is greater than a threshold number. If the number of requests for the multimedia is greater than the threshold number the process flows to a step s348, where the application server determines that the entire multimedia file is to be transferred to the streaming server.

Alternatively, if the application server determines in step s346 that the number of requests for the multimedia file is less than or equal to the threshold number the process flows back to step s304. Returning now to step s348, the application server transfers the entire multimedia file to the streaming server and the process then flows to a step s334. In step s334, the streaming server determines the rate at which the multimedia file has been sent to all client apparatuses. The process then flows to a step s336, where the streaming server determines if the rate of transfer for the multimedia file is greater than a threshold number. If the rate of transfer for the media file is greater than a threshold number the process flows to a step s340, where the streaming server determines that the multimedia file should remain (continue to be stored) on the streaming server.

The process then flows back to the application server above step s306, so that the application server receives information that the multimedia file is still stored on the streaming server, as indicated in step s340. Returning now to step s336, if the streaming server determines that the rate of transfer for the multimedia file is less than or equal to the threshold number, the process flows to a step s338. In step s338, the multimedia file is purged from the streaming server and the process flows back to the application server, above step s306, so that the application server receives information that the multimedia file has been purged from the streaming server. Returning now to step s330, after the streaming server sends converted groups to the client apparatus, the process flows to a step s332. In step s332 the streaming server determines whether all converted groups have been sent to the client apparatus. If not all groups have been sent to the client apparatus steps s330 and s332 are repeated until all groups have been sent.

Returning now to step s306 it should be noted that a client address is transferred to the streaming server whether or not the multimedia file is in the streaming server. The client address transferred in step s306 is needed for step s330 to enable the streaming server to send converted groups to the client apparatus corresponding to the client address sent in step s306. As shown in FIG. 12, the data communication system of the present invention is capable of sending groups of data of a multimedia file directly to a client apparatus from the application server or sending groups of multimedia data from the streaming server to the client apparatus.

Further, the data communication system of the present invention is capable of determining if a multimedia file is located in a streaming server. Further, a garbage collection algorithm is included for purging multimedia files to ensure that there is enough space in the streaming server to hold stripped groups transferred from the application server to the streaming server.

Further, the data communication system of the present invention is able to optimize delivery of groups of multimedia data by comparing the transfer rate between the application server and the streaming server to the sending rate from the streaming server to the client apparatus and buffer the groups accordingly. Additionally, the garbage collection algorithm allows the most commonly streamed files to be kept on the streaming server while purging less frequently accessed multimedia files from the streaming server. This converses memory space on the streaming server which prevents overload of the streaming server due to receipt of a large number of client requests.

Finally, it is noted that the data communication system of the present invention stores some files on an application server, which is desirable for optimizing and perfecting database management.

What is claimed is:

1. A method for transferring multimedia data using a data communication system, comprising the steps of:
    storing on an application server a multimedia file including a plurality of groups of multimedia data, each of the groups having a predetermined data size;
    receiving a client request and reading a client address at the application server, the client address corresponding to at least one client apparatus;
    stripping consecutive groups from the multimedia file and buffering the consecutive groups in a staging buffer;
    transferring to a streaming server, the consecutive groups from the staging buffer and the client address;
    converting at the streaming server, each of the consecutive groups received from the staging buffer into a format readable by the at least one client apparatus;
    sending each of the consecutive groups to the at least one client apparatus; and
    selectively storing the multimedia file on at least one of the application server and the streaming server based on a number of client requests received for the multimedia file;
    the selectively storing the multimedia file comprises:
    determining, in the streaming server according to a garbage-collection algorithm, a rate of sending of the multimedia file from the streaming server to the at least one client apparatus;
    comparing the rate of sending to a threshold number; and
    purging the multimedia file from the streaming server when the rate of sending is less than the threshold number.

2. The method according to claim 1, wherein the multimedia file is a video file, each group of multimedia data comprises a video frame, each frame corresponds to a frame display duration, and a rate at which consecutive frames are transferred to the streaming server from the staging buffer corresponds to intervals of each display duration.

3. The method according to claim 2, wherein the video file is encoded in MPEG format.

4. The method according to claim 1, wherein the at least one client apparatus is selected from a group consisting of: a personal computer, a fax machine, a hard drive, a telephone interface, a wireless telephone, a radio receiver, and a personal digital assistant (PDA).

5. The method according to claim 1, wherein the multimedia file is selected from a group consisting of: video files, music files, computer generated graphics files, still image files, and sound files.

6. The method according to claim 1, further comprising the steps of:
- sending notice of a new client to the streaming server;
- determining, in the streaming server according to a garbage-collection algorithm, whether there is sufficient space in the streaming server to hold the consecutive groups from the staging buffer before the application server transfers the consecutive groups from the staging buffer to the streaming server; and
- purging at least one multimedia file from the streaming server when the determining step determines that there is not sufficient space in the streaming server to hold the stripped consecutive groups from the staging buffer.

7. The method according to claim 1, further comprising the steps of:
- determining at the streaming server, a transfer rate from the application server to the streaming server and a sending rate from the streaming server to the at least one client apparatus; and
- comparing the transfer rate to the sending rate before the streaming server performs the converting step.

8. The method according to claim 7, further comprising the step of:
- waiting a predetermined time period before performing the converting step in the streaming server, when the sending rate is greater than the transfer rate.

9. The method according to claim 1, wherein the step of selectively storing the multimedia file comprises the step of:
- determining in a request handler in the application server, the number of client requests from the at least one client apparatus for the multimedia file.

10. The method according to claim 9, wherein the step of selectively storing the multimedia file further comprises the steps of:
- comparing the number of client requests for the multimedia file to a threshold number; and
- transferring the multimedia file from the application server to the streaming server when the number of client requests is greater than the threshold number.

11. The method according to claim 1, wherein the rate of sending is a number of times the multimedia file has been sent over a predetermined time period, and the predetermined time period is selected from the a group consisting of one minute, one hour, one day, one week, one month, and one year.

12. The method according to claim 1, wherein the step of selectively storing the multimedia file comprises the steps of:
- determining, in the streaming server according to a garbage-collection algorithm, a rate of sending of the multimedia from the streaming server to the at least one client apparatus;
- comparing the rate of sending to a threshold number; and
- keeping the multimedia file stored on the streaming server when the rate of sending is greater than the threshold number.

13. The method according to claim 12, wherein the rate of sending is a number of times the multimedia file has been sent over a predetermined time period, and the predetermined time period is selected from a group consisting of one minute, one hour, one day, one week, one month, and one year.

14. The method according to claim 1, further comprising the step of:
- determining, in a time-division multiplexer program in the streaming server, a priority order for sending the stripped consecutive groups in the sending step, when there are a plurality of the least one client apparatus.

* * * * *